3,144,302
PREPARATION OF ISOCYANATES CONTAINING PHOSPHORUS
Harold Crosbie Fielding, Northwich, England, assignor to Imperial Chemical Industries Limited, London, England, a corporation of Great Britain
No Drawing. Filed Aug. 26, 1960, Ser. No. 52,038
Claims priority, application Great Britain Sept. 16, 1959
2 Claims. (Cl. 23—14)

This invention relates to a process for the preparation of phosphoryl tri-isocyanate and substituted phosphoryl isocyanates.

Phosphorus tri-isocyanate, $P(NCO)_3$, cannot be oxidised by oxygen alone at room temperature, or even at temperatures up to about 120° C. Catalysts such as ferric chloride, nitrous oxide and potassium chlorate are of no significant help, and whilst vapour-phase oxidation at 200° C. with oxygen in contact with glass or pumice surface does lead to some reaction the yields are low and the losses considerable.

We have now discovered that nitrogen dioxide can oxidise phosphorus tri-isocyanate to phosphoryl tri-isocyanate giving good yields at room temperature.

We have also discovered that substituted phosphorus isocyanates having the general formula $R_nP(NCO)_{3-n}$, wherein $n$ is 1 or 2 and R represents an alkyl, alkoxy, aryl or aryloxy group, may likewise be oxidised to the corresponding phosphoryl compounds $$\underset{\underset{O}{\parallel}}{R_nP(NCO)_{3-n}}$$

According to our invention we provide a process for making phosphoryl isocyanates having the general formula $$\underset{\underset{O}{\parallel}}{R_nP(NCO)_{3-n}}$$

wherein n is 0, 1 or 2 and R represents an alkyl, alkoxy, aryl or aryloxy group, comprising oxidising by means of nitrogen dioxide the corresponding phosphorus isocyanates having the general formula $R_nP(NCO)_{3-n}$.

The basic oxidation reaction may be represented by the equation $$P(NCO)_3 + NO_2 \rightarrow PO(NCO)_3 + NO$$

and the reaction proceeds substantially quantitatively, one mole of nitrogen dioxide giving rise to one mole of nitric oxide. If the nitric oxide be now oxidised by means of oxygen, either as such or as air, to regenerate nitrogen dioxide the latter can oxidise a further quantity of phosphorus tri-isocyanate, and so on. Thus a given quantity of nitrogen dioxide can act as an oxygen carrier and enable unlimited quantities of oxygen or air to oxidise equivalent quantities of phosphorus tri-isocyanate for so long as the regeneration cycle is maintained. Nitrogen dioxide may thus be regarded in some ways as a catalyst and accordingly a further, and indeed preferred, embodiment of the invention is to bring about the oxidation of phosphorus isocyanates represented by $R_nP(NCO)_{3-n}$ where $n$ is 0, 1 or 2 by means of a mixture of a major proportion of oxygen and a minor proportion of nitrogen dioxide.

That the reaction proceeds as described above may be readily demonstrated by arranging for a small proportion of nitrogen dioxide to be initially in contact with an excess of phosphorus tri-isocyanate dissolved in ethyl acetate in a suitable vessel. On making a connection from the vessel to a gas burette containing oxygen the theoretical quantity of the latter required for oxidation of the phosphorus tri-isocyanate will be gradually absorbed.

Examples of substituted phosphorus isocyanates having the general formula $R_nP(NCO)_{3-n}$ as hereinbefore defined that may be oxidised by the process are diethyl phosphorus monoisocyanate, ethyl phosphorus di-isocyanate, ethoxy phosphorus di-isocyanate, phenyl phosphorus di-isocyanate, phenoxy phosphorus di-isocyanate.

A convenient way of carrying out the preferred embodiment of the process, in which nitrogen dioxide is used in minor proportions, is to bubble a mixture of oxygen or dry air and nitrogen dioxide containing about 5% by volume of the latter up a long tube containing the phosphorus isocyanate dissolved in ethyl acetate or carbon tetrachloride. By adjusting gas-flow rate, bubble-size and column height an almost quantitative uptake of oxygen can be achieved and the corresponding phosphoryl isocyanate obtained in approximately 85–90% yield on subsequent distillation of the ethyl acetate solution. Other non-aqueous inert solvents may be used, for example chloroform, methylene chloride. Phosphorus tri-isocyanate may be oxidised in the absence of a solvent if desired.

It it is not desired to introduce a minor proportion of nitrogen dioxide continuously into the reaction system along with oxygen, but instead to make use over and over again of an amount added at the beginning, a convenient way of carrying out the reaction is to allow oxygen or dry air to flow into a partially evacuated vessel arranged for shaking and containing the phosphorus isocyanate dissolved in a suitable inert solvent, such as ethyl acetate, and a small proportion of nitrogen dioxide. On shaking the vessel the brown colour of nitrogen dioxide almost disappears as oxygen is steadily absorbed and does not reappear until the phosphorus isocyanate has reacted with the theoretical amount of oxygen.

If it is desired to oxidise a phosphorus isocyanate by means of nitrogen dioxide alone a convenient method is to prepare a solution of nitrogen dioxide in ethyl acetate and to add this to an ethyl acetate solution of the isocyanate containing an amount of the latter equivalent to the nitrogen dioxide. The reaction is exothermic and liberates nitric oxide which may be collected if desired; the mixed ethyl acetate solutions are distilled to separate the phosphoryl isocyanate.

The phosphoryl isocyanates react with compounds containing reactive hydrogen atoms, for example alcohols, amines, glycols, to give phosphoryl urethanes, phosphoryl ureas and similar compounds, some of which are polymeric and can be moulded and shaped and used in making laminates.

The following examples illustrate the invention but are not meant to restrict it.

*Example 1*

This example shows the oxidation of phosphorus tri-isocyanate by nitrogen dioxide alone. One-tenth of a mole of nitrogen dioxide was dissolved in 50 mls. of purified ethyl acetate. The solution was added, with stirring to a solution of 0.1 mole $P(NCO)_3$ in 50 mls. ethyl acetate. The exothermic reaction liberated a gas which was collected over water and identified as nitric oxide (approximately 1 mole). The remaining ethyl acetate solution, upon distillation, gave phosphoryl tri-isocyanate in 88% yield. No $P(NCO)_3$ was isolated.

*Example 2*

This example shows oxidation by a minor proportion of nitrogen dioxide and the stoichiometric amount of oxygen. 220 mls. (0.01 mole) of $NO_2$ was admitted into a 250 ml. evacuated flask fitted with dropping funnel and gas inlet tubes. 31 gm. (0.2 mole) $P(NCO)_3$ in 30 mls. ethyl acetate was then added through the dropping funnel, and the flask connected to a gas burette filled with oxygen. On shaking the flask, the brown nitrogen dioxide fumes almost disappeared, and oxygen was steadily absorbed from the gas burette until approximately the theoretical amount of oxygen had been taken up (0.1 mole) according to the equation $$2P(NCO)_3 + O_2 \rightarrow PO(NCO)_3$$

Distillation of the ethyl acetate solution gave phosphoryl triisocyanate in 86% yield; no $P(NCO)_3$ was isolated.

*Example 3*

This example shows oxidation by a mixture of oxygen and a minor proportion of nitrogen dioxide. Dry oxygen (150 mls. per minute) was mixed at a Y piece with nitric oxide (8 mls. per minute) and the resulting gas stream ($NO_2$ and excess oxygen) bubbled through a sintered glass disc into the bottom of a vertical tube containing a solution of phosphorus tri-isocyanate (0.5 mole) in ethyl acetate (100 mls.). The stream of fine bubbles rose through the liquid, becoming smaller and smaller, until after about a height of 50 cm. only insignificant quantities of gas remained. After 1 hour the ethyl acetate solution was distilled to give 80% phosphoryl tri-isocyanate; about 5% $P(NCO)_3$ was recovered unchanged.

*Example 4*

This example illustrates the oxidation of phosphorus tri-isocyanate in a falling film tower.

Phosphorus tri-isocyanate (2000 gm.) was circulated by an air-operated lift pump up into a reservoir and down a filming tower 3 ft. long and 2 ins. in diameter fitted with an external water-cooled jacket. Oxygen containing 2% $NO_2$ was passed up the tower against the downflow of isocyanate, at a rate of 4 litres/min., about 1 litre/min. being absorbed. Cooling water was used to maintain the temperature of the isocyanate between 35° and 40° C. The reaction was stopped when no more oxygen was absorbed. Distillation of the resultant liquid gave phosphoryl tri-isocyanate in 90% yield.

*Example 5*

Phenoxy phosphorus di-isocyanate (20 gm.) dissolved in carbon tetrachloride (20 mls.) was placed in a narrow tube 45 cm. long. Oxygen containing 2–3% nitrogen dioxide was bubbled through a glass sinter and up the column of liquid at a rate such that 90% of the oxygen was absorbed. The temperature of the exothermic reaction was controlled between 35° and 40° C. by an external cooling jacket containing water. The reaction was stopped when oxygen was no longer absorbed. Distillation of the reaction mixture gave phenoxy phosphoryl di-isocyanate, B.P. 104° at 2 mm., in 55% yield.

What we claim is:

1. A process for the manufacture of phosphoryl isocyanate having the general formula $$R_nP(NCO)_{3-n}$$
$$\parallel$$
$$O$$

wherein $n$ is a member of the group consisting of 0, 1 and 2 and R is a member of the group consisting of lower alkyl, lower alkoxy, phenyl and phenoxy groups, said process comprising oxidizing the corresponding phosphorus isocyanates having the general formula $$R_nP(NCO)_{3-n}$$

with a mixture of nitrogen dioxide and a member of the group consisting of oxygen and air, said mixture containing 2–5% of nitrogen dioxide, at a temperature between ambient temperature and 40° C.

2. A process for the manufacture of phosphonyl isocyanates as set forth in claim 1 in which said phosphorus isocyanate is phosphorus triisocyanate and the product is phosphoryl triisocyanate.

References Cited in the file of this patent

UNITED STATES PATENTS

| | | |
|---|---|---|
| 2,584,112 | Brown | Feb. 5, 1952 |
| 2,835,652 | Haven | May 20, 1958 |
| 2,953,596 | Rauhut et al. | Sept. 20, 1960 |

OTHER REFERENCES

Ephraim, F.: "Inorganic Chemistry," 4th Ed., Interscience Publishers Inc., New York, N.Y. (1943), pp. 666–673.

Fox et al.: "The Chemistry of Organo-Phosphorus Compounds," July 8, 1948, p. 21.

Addison et al.: "Chem. Soc. J.," August 1956, p. 2706.

Rose et al.: "The Condensed Chemical Dictionary" (1961), page 804.